(12) United States Patent
Shingyoji (10) Patent No.: US 8,217,829 B2
(45) Date of Patent: Jul. 10, 2012

(54) APPARATUS AND METHOD FOR DETERMINING AXIS DEVIATION OF RADAR

(75) Inventor: Masahito Shingyoji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 12/782,313

(22) Filed: May 18, 2010

(65) Prior Publication Data

US 2010/0295722 A1 Nov. 25, 2010

(30) Foreign Application Priority Data

May 19, 2009 (JP) ................ 2009-121282

(51) Int. Cl.
*G01S 13/00* (2006.01)
*G01S 7/40* (2006.01)
(52) U.S. Cl. ........ 342/70; 342/73; 342/74; 342/75; 342/165; 342/173; 342/174
(58) Field of Classification Search .......... 342/70–77, 342/81, 82, 89, 165, 173, 174
See application file for complete search history.

(56) References Cited

U.S. PATENT DOCUMENTS

| 3,772,696 | A | * | 11/1973 | Kummer | 342/75 |
| 6,122,040 | A | * | 9/2000 | Arita et al. | 356/4.01 |
| 6,195,157 | B1 | * | 2/2001 | Yamashita et al. | 356/4.01 |
| 6,614,387 | B1 | * | 9/2003 | Deadman | 342/70 |
| 6,714,156 | B1 | * | 3/2004 | Ibrahim et al. | 342/174 |
| 6,763,318 | B1 | * | 7/2004 | Winter et al. | 702/158 |
| 6,833,807 | B2 | * | 12/2004 | Flacke et al. | 342/70 |
| 7,079,073 | B2 | * | 7/2006 | Fujita | 342/174 |
| 7,132,976 | B2 | * | 11/2006 | Shinoda et al. | 342/70 |
| 7,167,235 | B2 | * | 1/2007 | Kikuchi | 356/4.01 |
| 7,196,656 | B2 | * | 3/2007 | Shirakawa | 342/147 |
| 7,221,310 | B2 | * | 5/2007 | Nakagawa | 342/174 |
| 7,304,602 | B2 | * | 12/2007 | Shinagawa et al. | 342/174 |
| 8,077,075 | B2 | * | 12/2011 | Randler et al. | 342/70 |
| 2002/0101372 | A1 | * | 8/2002 | Terashima et al. | 342/54 |
| 2002/0105456 | A1 | * | 8/2002 | Isaji | 342/165 |
| 2004/0174292 | A1 | * | 9/2004 | Isaji | 342/70 |
| 2004/0233094 | A1 | * | 11/2004 | Isaji et al. | 342/20 |

FOREIGN PATENT DOCUMENTS

JP 2006-275748 10/2006

* cited by examiner

*Primary Examiner* — Jack W Keith
*Assistant Examiner* — Peter Bythrow
(74) *Attorney, Agent, or Firm* — Rankin, Hill & Clark LLP (57) ABSTRACT

A radar, mounted on a vehicle, emits electromagnetic waves to a side area of a vehicle and receives reflected electromagnetic waves to detect a distance and a bearing of a physical object. A speed of the vehicle is detected. When the vehicle speed is greater than a predetermined value, it is determined whether multiple reflection occurs based on at least distances detected by the radar. If it is determined that the multiple reflection occurs, an axis deviation of the radar is determined based on a difference between the detected bearing of the multiple reflection waves and a reference bearing.

6 Claims, 6 Drawing Sheets

APPARATUS AND METHOD FOR DETERMINING AXIS DEVIATION OF RADAR

BACKGROUND OF THE INVENTION

The present invention relates to an apparatus and method for determining axis deviation of an on-vehicle radar.

Conventionally, radar is mounted on a vehicle to detect the distance and bearing of a physical object around the vehicle. Japanese Patent Publication Laid-Open (JP-A) No. 2006-275748 discloses an apparatus for determining the amount of axis deviation in the horizontal direction of an on-vehicle radar. According to this apparatus, distribution data of detected static targets is held in time series for a predetermined time period before the present time. Only when it is determined that the vehicle travels straight at both the present time and the predetermine time before, the distribution data obtained at the predetermined time before is integrated. The amount of axis deviation is calculated based on the integrated value.

In the above technique, in order to keep the accuracy of the amount of axis deviation, the distribution data obtained over a predetermined time period before and after the vehicle makes a transition from traveling straight to traveling along a curve or from traveling along a curve to traveling straight is ignored, thereby preventing the integration. Therefore, it is required to accurately determine whether the vehicle is traveling straight or traveling along a curve. Such determination is generally made, for example, by calculating a difference between the wheel speed of the inner wheel and the wheel speed of the outer wheel, or by using a yaw rate sensor. The accuracy of such determination may deteriorate due to an influence of, for example, wheel slip, and temperature or temporal drift of a yaw rate sensor. The deterioration in the accuracy of the determination may influence the detection of the axis deviation of a radar, which may cause an error in the amount of axis deviation.

Therefore, a technique is desired for determining an axis deviation of a radar with higher accuracy, without requiring the above determination.

SUMMARY OF THE INVENTION

According to one aspect of the present invention, a radar for emitting electromagnetic waves to a side area of a vehicle and receiving reflected electromagnetic waves to detect a distance and a bearing of a physical object, and a device for detecting a speed of the vehicle are mounted on the vehicle. It is determined whether multiple reflection occurs based on at least distances detected by the radar when the detected vehicle speed is greater than a predetermined value. An axis deviation of the radar is determined based on a difference between a bearing detected for the multiple reflection waves and a reference bearing if it is determined that the multiple reflection occurs.

The electromagnetic wave has the characteristics that, when it strikes the surface of a physical object that is perpendicular to the direction the wave travels, the wave is relatively strongly reflected to the opposite direction. The reflected electromagnetic wave may cause the multiple reflection. That is, reflection is repeated such that the reflected wave is reflected again at the emitting source, and then is reflected again on the surface of the physical object, and so on. The present invention focuses on such multiple reflection of the electromagnetic wave. If the vehicle speed is greater than a predetermined value and a physical object such as a wall or guardrail is present in the side area of the vehicle, it can be considered that the vehicle travels almost in parallel with the physical object. The electromagnetic wave from an on-vehicle radar may cause the multiple reflection with respect to the physical object. The multiple reflection waves can be considered as traveling perpendicularly to the physical object. Therefore, by detecting the bearing of the multiple reflection waves by the radar and comparing the detected bearing with a reference bearing, the axis deviation of the radar can be determined. According to the present invention, it is not required to obtain information regarding the traveling of the vehicle, such as information as to whether the vehicle is traveling straight or not. Therefore, the accuracy of determining the axis deviation can be improved. Because determining whether the multiple reflection occurs is implemented in a short time, determining the axis deviation can be implemented in a short time.

According to one embodiment of the present invention, the axis deviation of the radar is determined when the multiple reflection is determined two or more times.

The axis deviation of a radar is determined assuming that the vehicle is traveling almost in parallel with a physical object present in the side area of the vehicle. By making the determination of the axis deviation when the multiple reflection is determined two or more times, it can be more correctly determined whether the multiple reflection waves are obtained under a condition where the vehicle is traveling almost in parallel with the physical object such as a wall or guardrail.

According to one embodiment of the present invention, it is determined that the multiple reflection occurs when distances detected for received electromagnetic waves are obtained at equal intervals and a variation in bearings detected for the received electromagnetic waves is within a predetermined range. Thus, the accuracy of determining the multiple reflection can be improved by examining not only the distance but also the bearing.

Other features and advantages of the present invention will be apparent from the following detailed description of the present invention and the accompanying drawings.

DESCRIPTION OF THE PREFERRED EMBODIMENTS

Preferred embodiments of the present invention will be described referring to the attached drawings.

Figure 1:
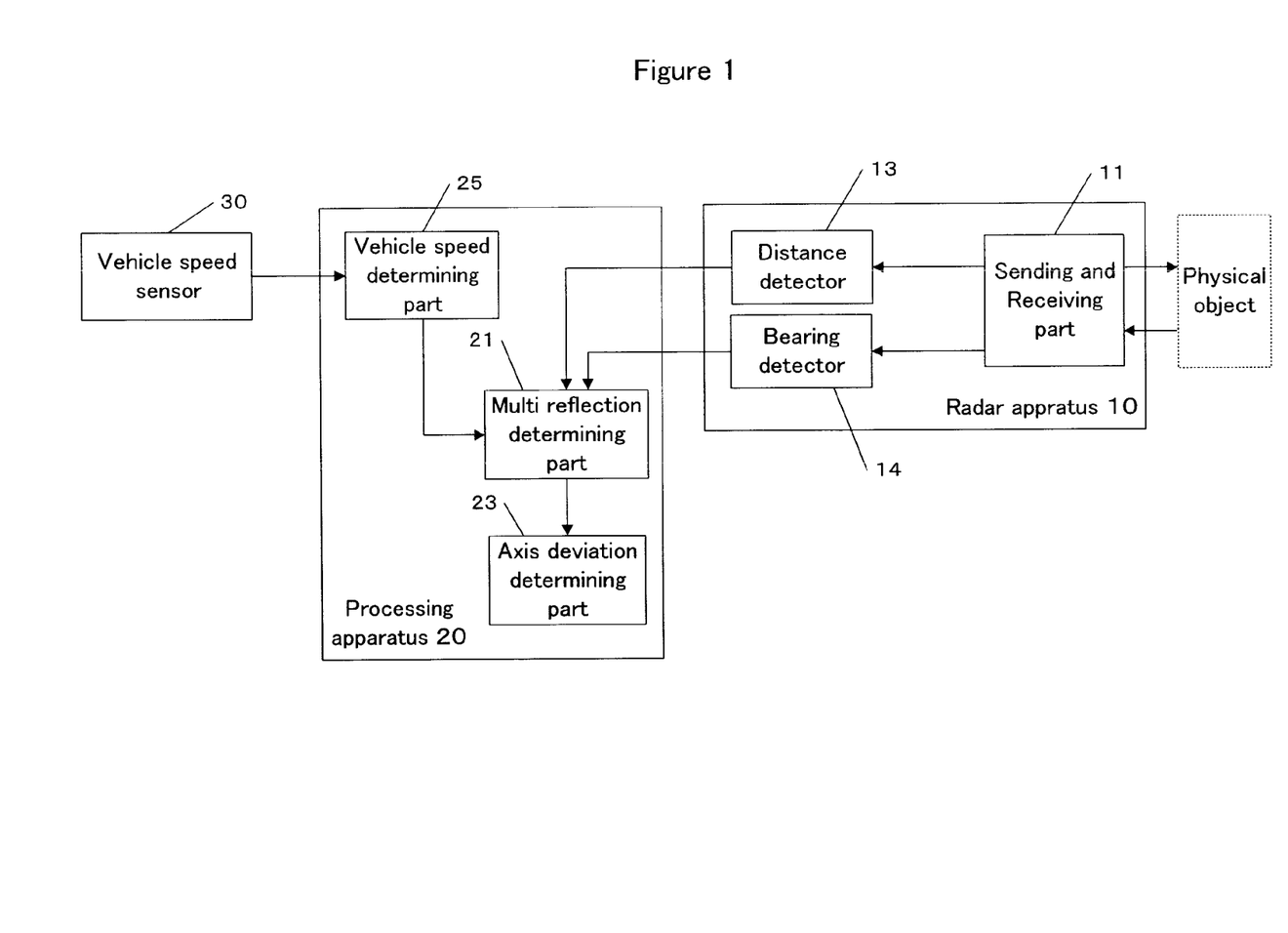
FIG. 1 shows a block diagram for an apparatus for determining an axis deviation of a radar in accordance with one embodiment of the present invention.

FIG. 1 shows a block diagram of an apparatus, mounted on a vehicle, for determining an axis deviation of a radar.

A radar apparatus 10 comprises a sending and receiving part 11 for emitting electromagnetic waves to a side area of the vehicle and receiving reflected waves that are generated by the emitted electromagnetic waves being reflected on a physical object (target), a distance detector 13 for detecting a distance to the physical object, and a bearing detector 14 for detecting a bearing of the physical object.

Any known radar apparatus can be used as the radar apparatus 10. For example, an FM-CW radar for transmitting a continuous wave that is frequency-modulated with the triangular wave, detecting a delay time based on a difference between the frequency of the reflected wave from a physical object and the frequency of the transmitted wave, and determining a distance to the physical object based on the detected delay time may be used. Or, a pulse radar for transmitting a short pulse signal and determining a distance to a physical object based on a delay time until receiving a reflected wave from the physical object may be also used. In order to detect the bearing, a monopulse scheme for providing a single transmitting antenna and two receiving antennas, receiving reflected waves with the two receiving antennas, and determining the bearing of a physical object based on a phase difference between the two reflected waves may be employed. Or, a beam scanning scheme for transmitting an electromagnetic wave while moving its horizontal direction, and detecting a bearing of a physical object based on the bearing from which the reflected wave is obtained may be employed.

Figure 2:
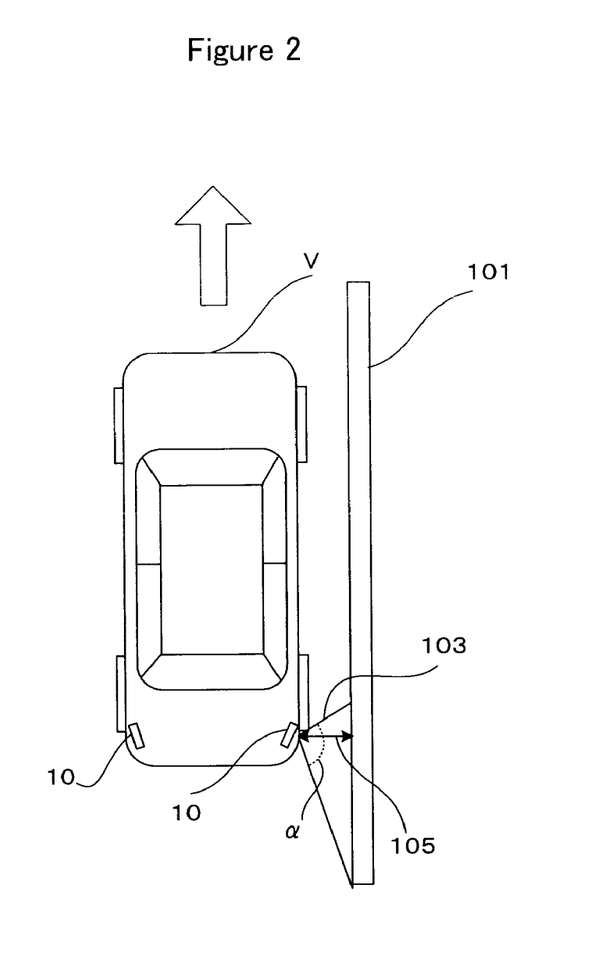
FIG. 2 shows one example of a state where a radar apparatus mounted on a vehicle emits electromagnetic waves to a physical object in accordance with one embodiment of the present invention.

Referring to FIG. 2, a state is shown where a vehicle V is traveling in parallel with a physical object 101 such as a wall, guardrail, or railing, as shown by the arrow. In this example, the radar apparatus 10 is attached to the right side and left side of the rear of the vehicle V. In the figure, the radar apparatus 10 on the right side of the rear of the vehicle emits electromagnetic waves to the right-rear side area of the vehicle. The radar apparatus 10 is configured to emit the electromagnetic waves over an area 103 having a predetermined angle α. The electromagnetic waves emitted by the radar apparatus 10 on the right side of the rear of the vehicle are reflected on the physical object 101. The reflected waves are received by the radar apparatus 10.

Although not shown in the figure, when a physical object is present in the left side area of the vehicle, the electromagnetic waves emitted by the radar apparatus 10 on the left side of the rear of the vehicle are reflected on the physical object, and the reflected waves are received by the radar apparatus 10.

In this example, the radar apparatus 10 is attached to the rear of the vehicle. However, the position where the radar apparatus is attached to the vehicle is not limited to this form. The radar apparatus 10 can be provided in an arbitrary position of the vehicle in such a manner as to emit the electromagnetic wave to the side area of the vehicle. Furthermore, in this example, two radar apparatuses 10 are mounted on the vehicle. However, the number of the radar apparatuses 10 to be mounted on the vehicle may be arbitrary determined. One or more radar apparatuses may be mounted.

Referring back to FIG. 1, the radar apparatus 10 is connected to a processing apparatus 20 that is a computer having a central processing unit (CPU) and a memory. The distance and bearing detected for each received reflection wave by the distance detector 13 and the bearing detector 14 are passed to the processing apparatus 20 as distance data and bearing data. The processing apparatus 20 comprises a multiple reflection determining part 21, an axis deviation determining part 23, and a vehicle speed determining part 25.

The multiple reflection determining part 21 obtains at least the distance data detected by the distance detector 13 and determines whether the multiple reflection occurs based on the distance data. As well known, the multiple reflection is a phenomenon where an electromagnetic wave emitted from the sending and receiving part 11 of the radar apparatus 10 repeats reflection a plurality of times between the radar apparatus 10 and a physical object. If the multi reflection occurs, a set of distance data in which there is an integral multiple relationship between distance values is generated.

Referring to FIG. 2 again, as shown by the emitting area 103 of the electromagnetic waves, the electromagnetic waves emitted from the radar apparatus 10 strike on the physical object 101 at various angles of incidence. However, as shown by the arrow 105, the electromagnetic wave that strikes perpendicularly to the surface of the physical object 101 is reflected perpendicularly to the surface of the physical object 101. The strength of this reflected wave is relatively high. Therefore, this reflected wave is reflected again on the radar apparatus 10, and then is reflected again on the surface of the physical object 101, and so on, which may cause the multiple reflection where reflection is repeated. If the multiple reflection occurs, a plurality of reflection waves including a reflection wave that is generated by a first reflection on the physical object, a reflection wave that is generated by a second reflection on the physical object, a reflection wave that is generated by a third reflection on the physical object, . . . are generated for an electromagnetic wave emitted at a given time. These reflection waves are received by the radar apparatus 10.

Assuming that a distance value R between the radar apparatus 10 and the physical object 101 at a certain time is constant, the distance data of a first reflection wave that is generated by the first reflection on the physical object 101 has the distance value R. The distance data of a second reflection wave that is generated by the second reflection on the physical object 101 has the distance value 2R. The distance data of a third reflection wave that is generated by the third reflection on the physical object 101 has the distance value 3R. In this way, the distance data of these reflection waves is generated at intervals of the distance value R. Therefore, based on whether a set of the distance data (distance values) with equal distance intervals is generated, it can be determined whether the multiple reflection has occurred.

Figure 3:
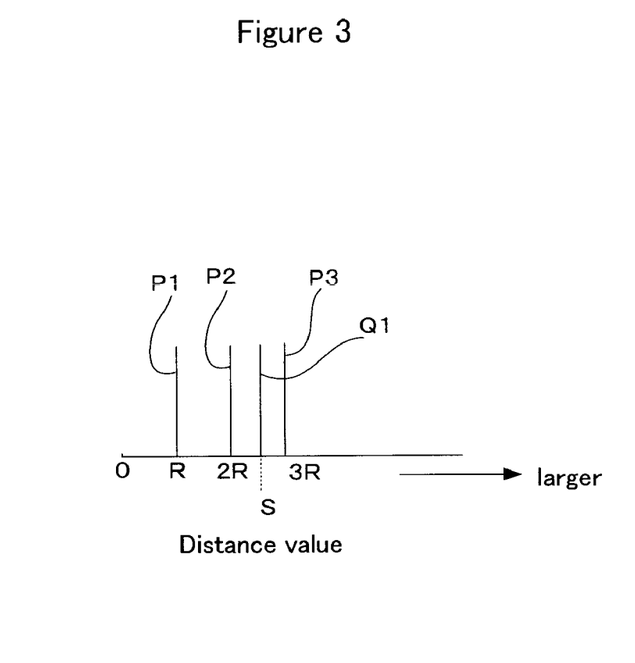
FIG. 3 shows one example of distance data obtained for multiple reflection in accordance with one embodiment of the present invention.

FIG. 3 shows one example of the distance data detected at a certain time by the radar apparatus 10 attached to the vehicle as shown in FIG. 2. The horizontal axis indicates the distance value. From the figure, it is seen what distance value is detected for each reflection wave. In this example, a difference between the value R of the distance data of the reflection wave P1 and the value 2R of the distance data of the reflection wave P2 is R. A difference between the value 2R of the distance data of the reflection wave P2 and the value 3R of the distance data of the reflection wave P3 is R. Both differences are equal. Therefore, it is determined that the reflection waves P1 through P3 forms the multiple reflection. The reflection wave P1 is a first reflection wave. The reflection wave P2 is a second reflection wave. The reflection wave P3 is a third reflection wave.

In contrast, the value of the distance data of the reflection wave Q1 is S. There is no reflection wave having a distance value that forms the equal intervals with the distance value S. Therefore, it can be determined that the reflection wave Q1 is a reflection wave from, for example, another obstacle different from the physical object 101 and hence is irrelevant to the multiple reflection.

Thus, in one embodiment, the multiple reflection determining part 21 examines distance values (distance data) obtained at a certain time. If a set of distance values arranged at equal distance intervals is extracted, it is determined that the multiple reflection occurs. If such a set of distance values is not extracted, it is determined that the multiple reflection does not occur. Here, a required number of distance values at equal distance intervals are at least three as shown in FIG. 3. In this regard, a threshold value may be set. For example, if the number of the extracted distance values at equal distance intervals is greater than the threshold value, it is determined that multiple reflection occurs.

The actual distance value from the radar apparatus 10 to the physical object 101 may not be constant, or may change while the vehicle is traveling. Therefore, the above "equal distance intervals" means that distance values obtained at a time are arranged at equal distance intervals. Of course, the intervals between distance values at one time and the intervals between distance values at another time may differ.

In a more preferable embodiment, the multiple reflection determining part 21 receives the bearing (angle) values detected by the bearing detector 14 for the reflection waves corresponding to the distance values extracted as having the equal distance intervals, and examines whether a variation in the bearing values is within a predetermined range. If the variation in the bearing values is within the predetermined range, it is determined that the multiple reflection occurs. If the variation in the bearing values is not within the predetermined range, it is determined that the multiple reflection does not occur. As described above, the multiple reflection is a phenomenon where reflection is repeated a plurality of times between a physical object and a radar apparatus. As long as the vehicle is positioned almost in parallel with a physical object in the side area of the vehicle, the multiple reflection waves should arrive from almost the same direction. Thus, by examining not only the distance but also the bearing, it can be determined with better accuracy that the multiple reflection occurs.

While the vehicle is traveling almost in parallel with a side object, the vehicle may slightly swing. Furthermore, the surface of a physical object may have some uneven spots. Therefore, a variation may occur in the bearing values of the multiple reflection waves. If a magnitude of a variation is larger, the accuracy of determining the bearing of the physical object, performed in the subsequent process, may be deteriorated due to, for example, a larger swing of the vehicle. As a result, an erroneous determination for the axis deviation may occur. By determining the multiple reflection based on not only the distance but also the bearing, such an erroneous determination can be better avoided.

Figure 4:
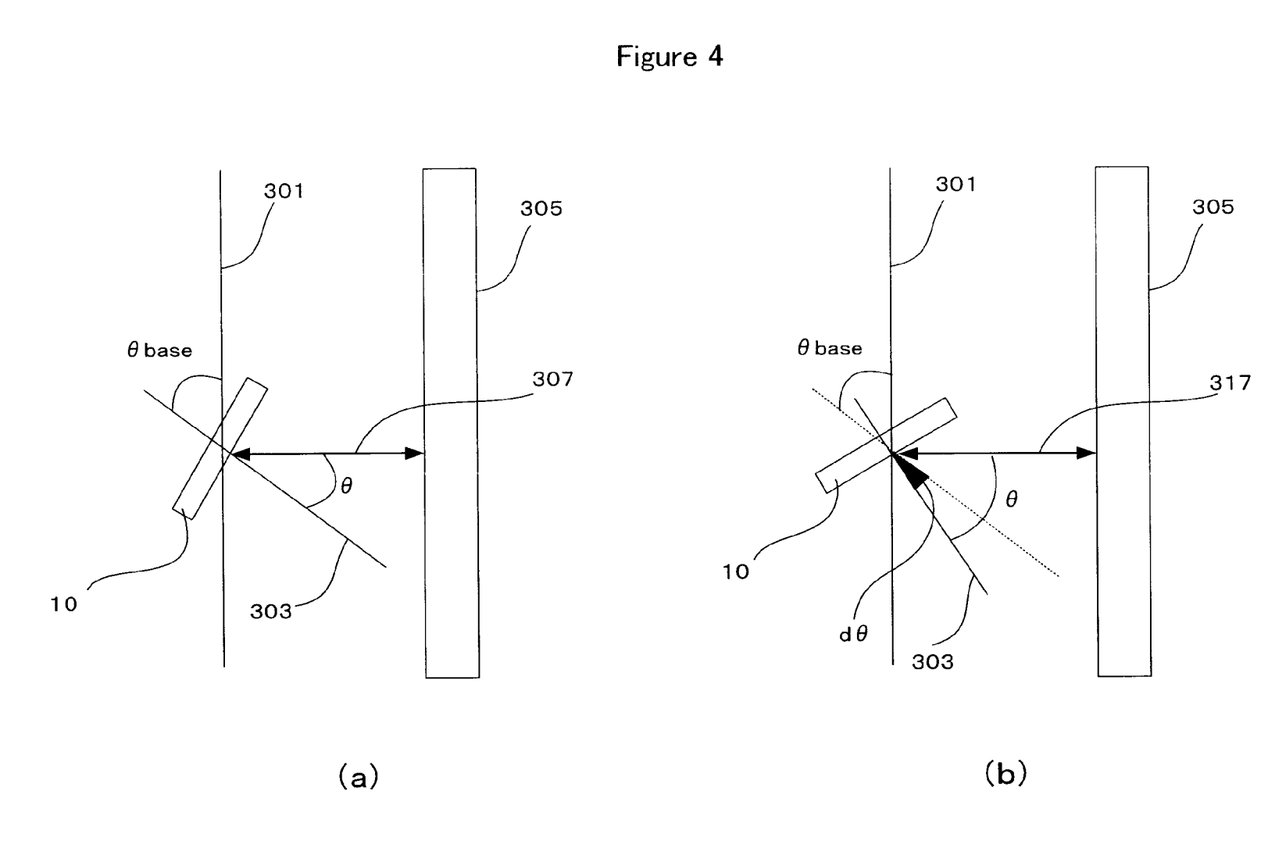
FIG. 4(a) and 4(b) show a diagram indicating an amount of axis deviation in accordance with one embodiment of the present invention.

Referring back to FIG. 1, if it is determined that multiple reflection occurs, the axis deviation determining part 23 determines the axis determination of the radar apparatus 10. A summary of this determination technique will be described. FIG. 4(a) indicates a case where there is no axis deviation in the radar apparatus 10. FIG. 4(b) indicates a case where there is axial deviation in the radar apparatus 10.

The radar apparatus 10 is attached to the vehicle such that an axis 303 of the radar apparatus 10 has a predetermined angle θbase (hereinafter referred to as an attachment angle) with respect to an axis 301 of the vehicle. Here, the radar axis 303 is along a predetermined line extending in the emitting direction of the electromagnetic waves. For example, the radar axis 303 may be along a line that divides the angle α of the emitting area 103 (FIG. 2) into two ranges each having the angle α/2 in the horizontal plane. The vehicle axis 301 and the physical object 305 are positioned in parallel to each other.

In FIG. 4(a), multiple reflection waves 307 between the radar apparatus 10 and the physical object 305 are shown. As described above, the multiple reflection waves can be considered as traveling perpendicularly to the surface of the physical object. Because there is no axis deviation in the radar apparatus 10, the bearing (angle) θ detected for the reflection waves 307 received by the radar apparatus 10 is "90 degrees—the attachment angle θbase".

FIG. 4(b) indicates a state where the axis 303 of the radar apparatus 10 deviates in the horizontal direction by dθ from the state of FIG. 4(a). The dotted line indicates a position of the axis 303 shown in FIG. 4(a). Similarly to the case of FIG. 4(a), the multiple reflection waves 317 between the radar apparatus 10 and the physical object 305 are shown. The reflection waves 317 travel perpendicularly to the surface of the physical object. Because the axis 303 of the radar apparatus 10 deviates by dθ, the bearing (angle) θ detected for the reflection waves 317 is "90 degrees−θbase+dθ". Because the above attachment angle θbase is a predetermined value, or a value obtained by learning as described later, the amount of axis deviation (which is expressed as an angle) dθ of the radar apparatus 10 can be calculated by calculating a difference between the bearing θ detected for the multiple reflection waves and "90 degrees−attachment angle θbase".

In this way, the axis deviation determining part 23 receives the bearing detected by the bearing detector 14 for reflection waves determined as forming the multiple reflection by the multiple reflection determining part 21 and determines the amount of axis deviation based on a comparison between the received bearing and a reference bearing (which is "90−attachment angle", in this embodiment).

Referring back to FIG. 1, a vehicle speed sensor 30 is attached to the vehicle. The vehicle speed sensor 30 detects a speed of the vehicle. The detected vehicle speed is sent to the processing apparatus 20. The vehicle speed determining part 25 determines whether the vehicle speed is greater than a predetermined value. When it is determined that the vehicle speed is greater than the predetermined value, the processes by the multiple reflection determining part 21 and the axis deviation determining part 23 are performed. This is because the determination for the axis deviation is made assuming that the vehicle is positioned almost in parallel with a physical object in the side area of the vehicle. In other words, this is because the determination for the axis deviation is made assuming that the multiple reflection waves are detected in a predetermined direction (angle) in the case where there is no axis deviation in the radar apparatus 10 (see FIG. 4(a)).

Figure 5:
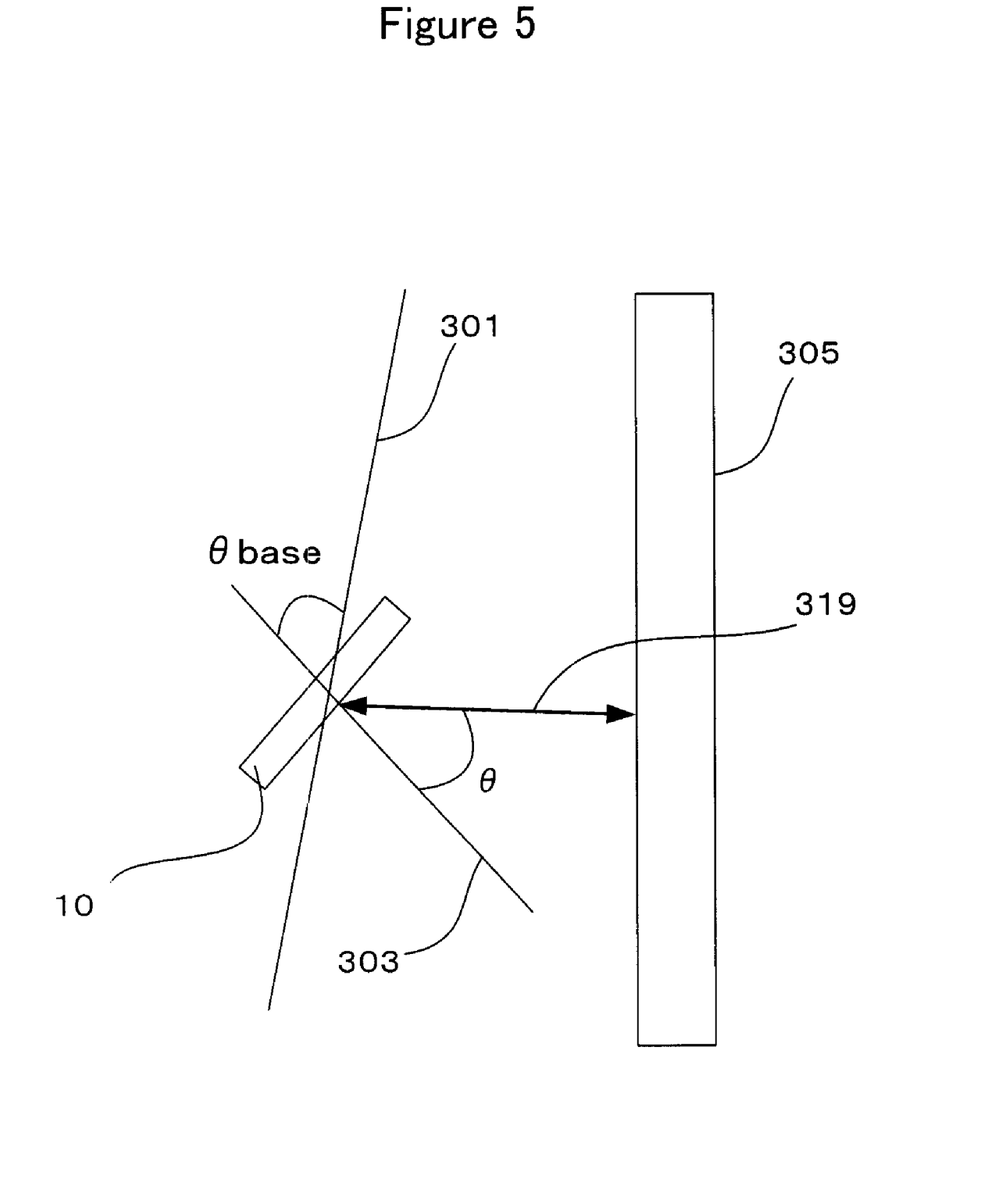
FIG. 5 shows a diagram for explaining problems of determining an amount of axis deviation when a vehicle is not in parallel with a side physical object in accordance with one embodiment of the present invention.

Here, referring to FIG. 5, one example is shown where the above assumption is not met. The axis 301 of the vehicle is positioned as having a tilt in the horizontal direction with respect to the physical object 305. There is no axis deviation in the radar apparatus 10. In such a state, the multiple reflection waves perpendicularly to the physical object 305 are detected as shown by the arrow 319 and the bearing θ of the reflection waves 319 is detected. Because there is no axis deviation in the radar apparatus 10, the bearing θ should be equal to "90−attachment angle θbase" as described referring to FIG. 4(a). However, because the vehicle is not in parallel with the physical object 305 in the case of FIG. 5, the bearing θ is not equal to "90−attachment angle θbase". If the axis deviation is determined under such a situation, an erroneous determination may be made.

In order to avoid such erroneous determination, the axis deviation is determined when the vehicle travels at a speed greater than a predetermined value. If there is a physical object such as a wall, guardrail, or railing in the side area of the vehicle when the vehicle travels at a speed greater than the predetermined value, it can be considered that the probability that the vehicle travels almost in parallel with the physical object is high. In a state where the vehicle is stopped, because the vehicle can stop as having an arbitrary tilt with respect to the side physical object, an erroneous determination as shown in FIG. 5 may be made. In a case where the vehicle travels at a low speed, for example, during a parallel parking, the vehicle has often an arbitrary tilt with respect to the side physical object. Therefore, the determination for the axis deviation is not made when the vehicle is stopped or travels at a low speed.

Next, referring to FIG. 6, a detail of a process for determining an axis deviation, which is performed by the processing apparatus 20, in accordance with a first embodiment of the present invention will be described. This process may be performed at predetermined time intervals.

In step S1, an output signal from the vehicle speed sensor 30 is obtained. In step S2, it is determined whether the vehicle speed indicated by the output signal is greater than a predetermined value. If the vehicle speed is not greater than the predetermined value (step S2 is No), this process exits because it is difficult to keep the accuracy of determining the axis deviation as described above. If the vehicle speed is greater than the predetermined value (step S2 is Yes), the distance data and the bearing data detected for reflection waves received by the radar apparatus 10 are obtained. Thus, the distance data (distance value) and the bearing data (bearing value) for each reflection wave are obtained as shown in FIG. 3.

In step S4, the process tries to extract distance values that appear at equal distance intervals from the obtained distance values. As described referring to FIG. 3, if a set of distance values appearing at equal distance intervals such as P1, P2 and P3 in FIG. 3 are extracted (S4 is Yes), the process proceeds to step S5.

In step S5, a variation in the bearing (angle) values obtained for the reflection waves corresponding to the set of the distance values extracted in step S4 is calculated, and it is determined whether a magnitude of the variation is within a predetermined range. This is based on the findings that multiple reflection waves corresponding to the set of the distance values having equal distance intervals should arrive from almost the same direction. Therefore, if the magnitude of the variation in the bearing values of the reflection waves is within the predetermined range (for example, five degrees), it is determined that multiple reflection occurs (S5 is Yes). The process proceeds to step S6. The calculation of the variation is implemented by, for example, detecting a minimum value and a maximum value from the bearing values of the reflection waves and calculating a magnitude of a difference between the minimum and maximum values.

If a set of distance values appearing at equal distance intervals is not extracted in step S4 (S4 is No), or if a variation in the bearing values of the reflection waves corresponding to the set of the distance values is not within the predetermined range in step S5 (S5 is No), it is determined that the multiple reflection does not occur. The process exits. Thus, by examining not only the distance but also the bearing, the accuracy of determining whether the multiple reflection occurs can be improved.

Here, it is preferable that the determination whether multiple reflection occurs is made two or more times. For example, the process from step S3 to step S5 is repeated at predetermined time intervals, or every predetermined travel distance of the vehicle. If the multiple reflection is determined two or more times, the process proceeds to step S6. If the multiple reflection is not determined two or more times, the process exits. Alternatively, if the multiple reflection is determined continuous times, the process may proceed to step S6, thereby improving the accuracy of determining the axis deviation.

As described above, the determination of the axis deviation is made assuming that the vehicle travels almost in parallel with a side physical object, in other words, assuming that the multiple reflection occurs in a predetermined direction in a case where there is no axis deviation in the radar apparatus 10 (see FIG. 4(a)). If the physical object in the side area of the vehicle is a physical object that extends longer along the travel direction of the vehicle, the multiple reflection should be determined two or more times while the vehicle is traveling. In contrast, there may be a physical object such as a wall whose surface has a tilt toward the roadway (if the multiple reflection is detected for such a wall, an erroneous determination may be made in a similar way to the case of FIG. 5). However, there are few cases where a wall having such a special form extends longer along the travel direction of the vehicle. Therefore, by making the determination of the multiple reflection two or more times, it can be determined whether the multiple reflection is detected for a physical object extending longer along the travel direction of the vehicle such as a wall or guardrail.

In step S6, the bearing of the physical object is calculated. More specifically, an average value of the bearing (angle) values for the reflection waves determined as forming the multiple reflection is calculated. The average value thus calculated can be used as the bearing of the physical object. If the determination of the multiple reflection is performed two or more times, an average value of the bearing values for all the reflection waves forming all the multiple reflections thus detected two or more times may be calculated, or an average value of the bearing values for selected reflection waves may be calculated. The average value thus calculated can be used as the bearing of the physical object.

In step S7, it is determined whether the bearing (angle) thus calculated has a difference greater than a predetermined value with respect to a reference angle. If so (step S7 is Yes), it is determined that there is an axis deviation in step S8. If not (step S7 is No), it is determined that there is no axis deviation, and hence the process exits.

In one embodiment, the reference angle may be established based on the attachment angle of the radar apparatus 10 with respect to the vehicle axis, as described above. When the attachment as shown in FIG. 2 is made, the reference angle is "90degrees−attachment angle θbase".

In another more preferable embodiment, the reference angle is established considering a tolerance regarding the attachment of the radar and a tolerance regarding the output of the radar. Let an error obtained by summing up these tolerances be β. When the attachment as shown in FIG. 2 is made, the reference angle is set to "90 degrees−attachment angle θbase" ±β.

Here, the tolerance regarding the attachment of the radar indicates an allowable error that possibly occurs in the attachment position when the radar apparatus 10 is attached to the vehicle, and is predetermined. The tolerance regarding the output of the radar indicates an allowable error that is possibly included in the output of the radar, and is predetermined. It cannot be considered that a deviation within these error ranges is caused due to the axis deviation of the radar. Therefore, if a deviation is within these error ranges, it is determined that the axis deviation does not occur. If a deviation exceeds these error ranges, it can be considered that it is caused due to the axis deviation. Therefore, it is determined that the axis deviation occurs.

If the axis deviation is determined, a difference between the bearing of the physical object determined in step S6 and the reference angle is outputted as the amount of axis deviation. Thus, the amount of axis deviation can be determined together with determining whether the axis deviation occurs.

Figure 6:
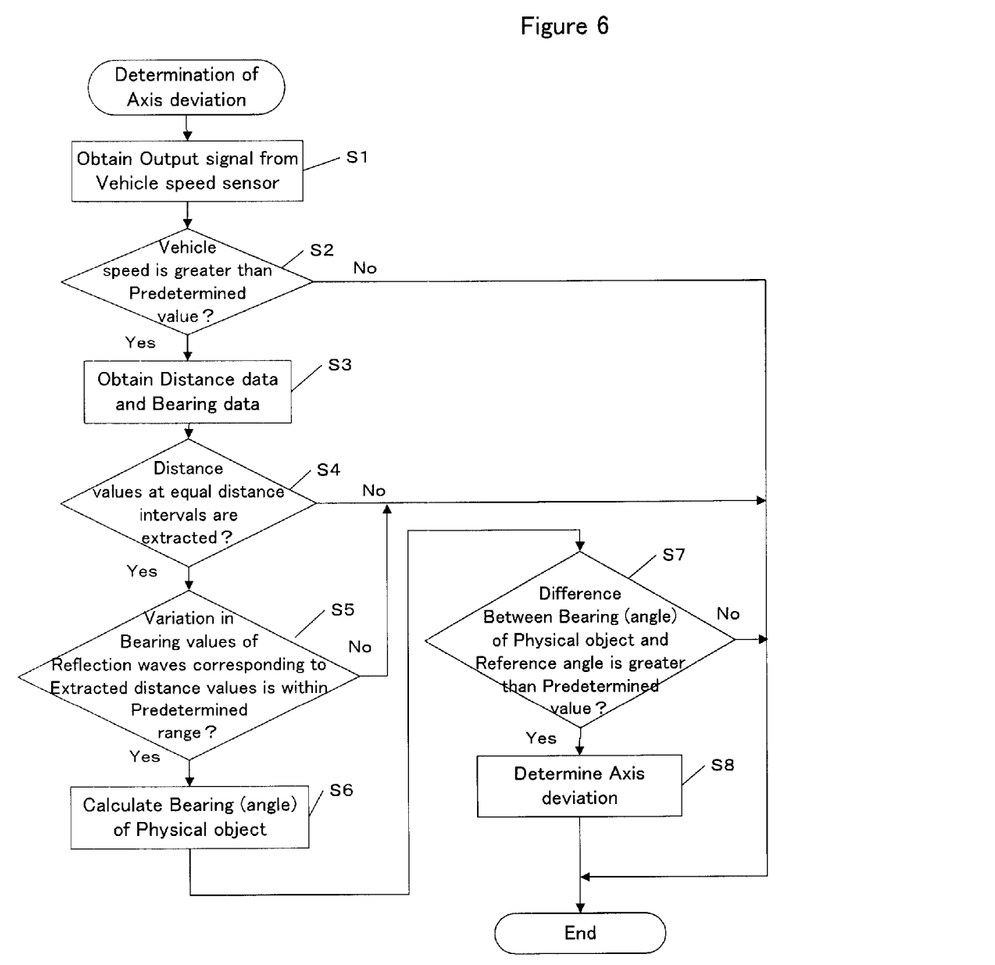
FIG. 6 is a flowchart of a process for determining an axis deviation in accordance with a first embodiment of the present invention.
Figure 7:
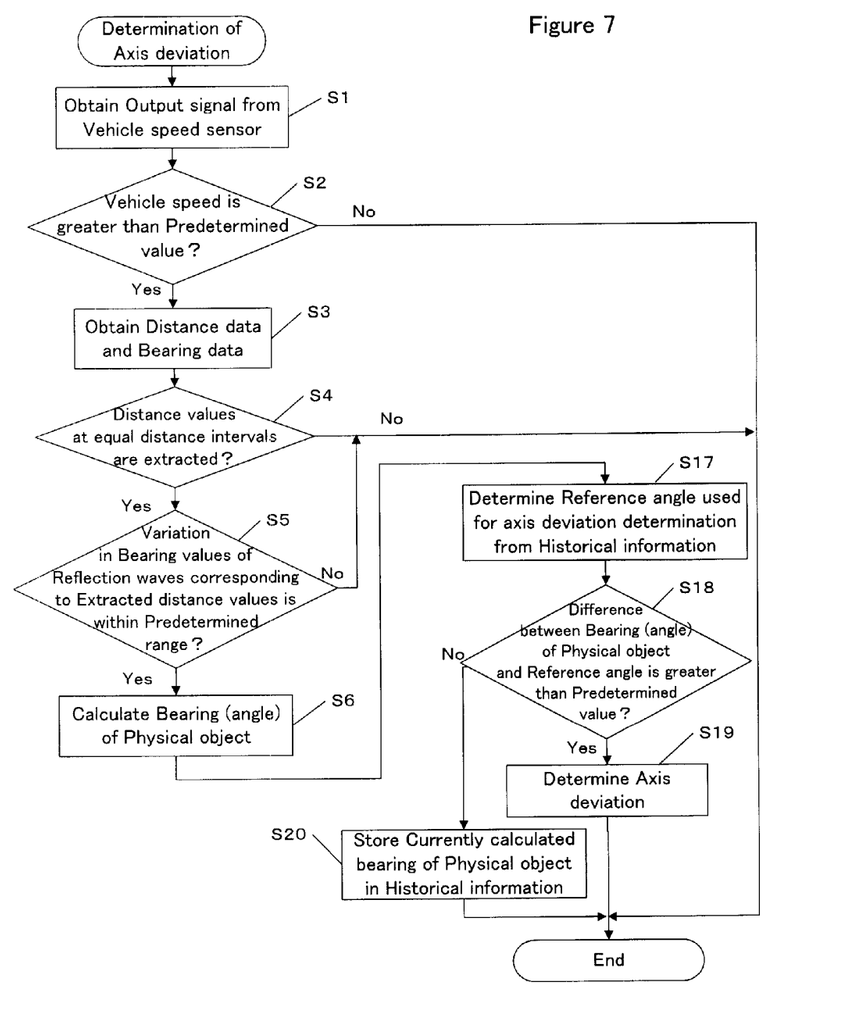
FIG. 7 is a flowchart of a process for determining an axis deviation in accordance with a second embodiment of the present invention.

FIG. 7 shows a detail of a process for determining an axis deviation, which is performed by the processing apparatus 20, in accordance with a second embodiment of the present invention. This process may be performed at predetermined time intervals. The second embodiment differs from the first embodiment in that steps S17 through S20 are provided, in place of steps S7 and S8 in FIG. 6. The other steps are the same as FIG. 6 and hence description thereof is omitted.

Immediately after the radar apparatus 10 is attached to the vehicle, it can be considered that there is no axis deviation. Therefore, the above reference angle can be automatically learned by performing the process according to the second embodiment. According to this embodiment, the axis deviation can be determined even when the above attachment angle and tolerances are unknown in advance.

In step S17, the reference angle is determined based on historical information. The historical information is stored in a memory in the processing apparatus 20. The historical information is a data file in which the bearing data of the physical object is accumulated in time series. For example, referring to the historical information, bearing values during a latest predetermined time period are extracted to calculate an average value thereof. The average value thus calculated can be set in the reference angle. When there is no bearing data in the historical information (for example, when this process is first performed), the bearing of the physical object determined in step S6 can be used as an initial value of the reference angle.

In step S18, the reference angle determined in step S17 and the bearing of the physical object calculated in step S6 are compared to determine whether a difference between the bearing of the physical object and the reference angle is greater than a predetermined value. If the difference is not greater than the predetermined value, the current value of the bearing of the physical object calculated in step S6 is stored in the historical information. If the difference is greater than the predetermined value, it is determined that there is an axis deviation in step S19. Similarly to the first embodiment shown in FIG. 6, a difference between the currently detected bearing of the physical object and the reference angle can be calculated as the amount of axis deviation.

Thus, when this process is repeatedly performed, the bearing (angle) data of the physical object when the decision of step S18 is No, that is, when the axis deviation is not determined, is accumulated in the history information in time series. As described above, if this process is performed immediately after the radar apparatus is attached to the vehicle, the bearing data of the physical object thus accumulated in time series can be considered as the reference angle because it can be considered that the axis deviation has not occurred in the radar apparatus. Although the reference angle is updated based on the bearing data in time series every time step S17 is performed, a variation in the reference angle is small because the bearing (direction) in which the multiple reflection occurs is actually constant unless the axis deviation does not occur. If the axis deviation occurs at a certain time, the decision of step S18 becomes Yes, and hence storing the bearing data in the historical information is stopped.

In both embodiments as shown in FIGS. 6 and 7, if the axis deviation is determined, a correction with the amount of axis deviation may be made. For example, after the axis deviation is determined, the bearing detected by the radar apparatus 10 is corrected with the amount of axis deviation. In doing so, the bearing of the physical object can be more correctly detected even after the axis deviation is determined.

Thus, according to the present invention, by utilizing the multiple reflection of the electromagnetic wave, the axis deviation of a radar can be determined based on the distance and bearing from the radar. Therefore, one or more sensors for detecting whether the vehicle travels straight or travels along a curve is not required. It can be avoided that an error regarding such sensors influences the axis deviation determination. Because the multiple reflection of the electromagnetic wave is utilized, the axis deviation can be determined in a short time.

The present invention should not be limited to the foregoing description of the embodiments and may be taken into practice by adding various modifications to the foregoing embodiments without departing from the gist of the invention.

What is claimed is:

1. An apparatus mounted on a vehicle for determining an axis deviation of a radar comprising:
    a radar for emitting electromagnetic waves to a side area of the vehicle and receiving reflected electromagnetic waves to detect a distance and a bearing of a physical object;
    a device for detecting a speed of the vehicle; and
    a processing unit configured to:
    determine whether multiple reflection occurs based on at least distances detected by the radar when the detected vehicle speed is greater than a predetermined value, and
    determine an axis deviation of the radar based on a difference between a bearing detected for the multiple reflection waves and a reference bearing if it is determined that the multiple reflection occurs.

2. The apparatus of claim 1,
    wherein the processing unit determines the axis deviation of the radar when the multiple reflection is determined two or more times.

3. The apparatus of claim 1,
    wherein the processing unit determines that the multiple reflection occurs when distances detected for received electromagnetic waves are obtained at equal intervals and a variation in bearings detected for the received electromagnetic waves is within a predetermined range.

4. A method for determining an axis deviation of a radar comprising:
    emitting electromagnetic waves to a side area of the vehicle and receiving reflected electromagnetic waves by a radar to detect a distance and a bearing of a physical object;
    detecting a speed of the vehicle; and
    determining whether multiple reflection occurs based on at least distances detected by the radar when the detected vehicle speed is greater than a predetermined value; and
    determining an axis deviation of the radar based on a difference between a bearing detected for the multiple reflection waves and a reference bearing if it is determined that the multiple reflection occurs.

5. The method of claim 4,
    wherein the step of determining an axis deviation is performed when the multiple reflection is determined two or more times.

6. The method of claim 4, further comprising determining that the multiple reflection occurs when distances detected for received electromagnetic waves are obtained at equal intervals and a variation in bearings detected for the received electromagnetic waves is within a predetermined range.

* * * * *